UNITED STATES PATENT OFFICE.

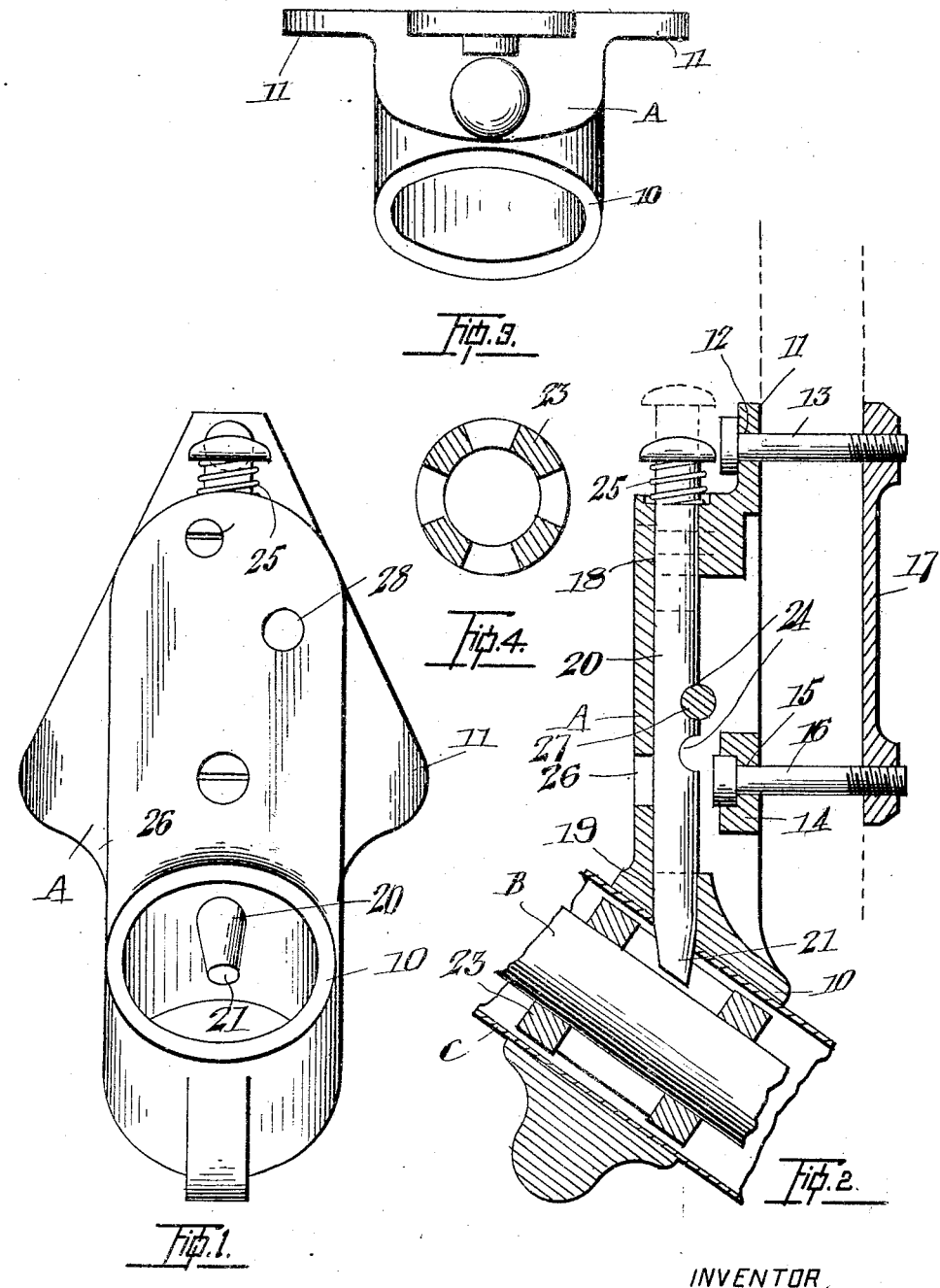

WILLIAM BENSON TURNER, OF OTTAWA, ONTARIO, CANADA.

STEERING-WHEEL LOCK.

1,347,564.   Specification of Letters Patent.   Patented July 27, 1920.

Application filed December 26, 1919. Serial No. 347,410.

*To all whom it may concern:*

Be it known that I, WILLIAM BENSON TURNER, a subject of the King of Great Britain, a resident of the city of Ottawa, Province of Ontario, Dominion of Canada, have invented certain new and useful Improvements in Steering-Wheel Locks, of which the following is a specification.

This invention relates to improvements in steering wheel locks designed for use on automobiles and like vehicles, and the objects of the invention are to lock the steering wheel mechanism when the automobile is parked and not in use, so that unauthorized persons cannot appropriate, steal or use the automobile or vehicle, to permit of the lock being readily mounted on automobiles at present in use, to simplify the mechanism and render the several parts fool proof, and generally to adapt the lock to better perform the functions required of it.

With the above and other objects in view, the invention consists essentially of the improved construction particularly described and set forth in the following specification and accompanying drawings forming part of the same.

In the drawings:

Figure 1 is a front elevation of the improved lock.

Fig. 2 shows a vertical section through the lock, as seen when in position on the casing of the steering spindle.

Fig. 3 is a plan view of the improved lock.

Fig. 4 is a transverse section through the collar mounted on the steering spindle.

Like characters of reference refer to like parts in the several figures.

Referring to the drawings; A represents the improved steering wheel lock, B the steering spindle, and C the casing which houses the spindle, the lock A being provided with a collar 10 which frictionally engages and embraces the casing C.

The lock A is formed with a flange 11 provided with an orifice 12 through the upper end, through which the pin 13 passes, and a transversely extending bar 14 is formed integral with the flange 11 and provided with an orifice 15 through which the pin 16 passes.

The flange 11 engages the dash board of the automobile, and the pins 13 and 16 after passing through the orifices 12 and 15 are threaded into a clamping plate 17

The lock A is provided with a pair of vertically disposed orifices 18 and 19 arranged in alinement and through these orifices the vertically disposed locking pin 20 passes. This pin is provided at the lower end with a tapered locking point 21, designed to engage with the peripheral pockets or recess in the collar 23, which is mounted on the steering spindle B.

The pin 20 is provided intermediate of its length with a plurality of recesses 24 and is normally held out of engagement with the collar 23 by a spiral spring 25, which encircles the pin and is located between the head thereof and the upper edge of the lock A.

It should be particularly noted that when the locking pin 20 is in position it acts as a cover member for the pins 13 and 16 which cannot be withdrawn, so that it is impossible to bodily remove the lock in an endeavor to appropriate, steal or use the automobile.

The pin 16 is positioned through the front of the lock A by providing an orifice 26 in alinement with an orifice 15, and the vertically disposed pin 20 is locked in the desired position by a transversely extending locking bolt 27 which forms part of an auxiliary lock of any suitable form, which will be attached to the lock A.

It is not necessary to describe the auxiliary lock because it may be of any well known type, and provision is made in the front of the device A for a keyhole as shown at 28.

The lock casing may be inserted between the outer wall of the lock A and the inner face of the dashboard.

When the lock has been mounted in the desired position in proximity to the steering spindle then the collar 10 will embrace the casing C of the spindle and be secured frictionally thereon. The pins 13 and 16 are now inserted through the orifices 12 and 15 and threaded to the back plate 17.

The locking pin 20 is inserted in the orifices 18 and 19 and will act as a cover member of the outer ends of the pins 13 and 16 which cannot thus be removed. The locking pin 20 is normally held out of engagement with the collar 23 by the spring 25.

Whenever an automobile is parked, when not in use and it is desired to lock the same, the pin 20 is engaged with the collar 23 of the steering spindle B, and the locking bolt 27 of the auxiliary lock will be engaged with a recess 24 to retain the tapered point of the pin 20 in the desired position relatively to the collar.

It should be noticed that more than one recess 24 is illustrated and if the user desires the locking bolt 27 may be engaged with the lower recess 24 and so keep the locking pin out of contact with the collar 23 when not in use, so that even although the spring 25 should become inoperative, then the locking pin 20 would be held in elevated position and disengaged from the collar 23.

This lock is of a very simple nature and can be readily mounted on standard types of automobiles at present in use.

As many changes could be made in the above construction and many widely different embodiments of my invention within the scope of the claim, constructed without departing from the spirit or scope thereof, it is intended that all matter contained in the accompanying specification and drawings shall be interpreted as illustrative and not in a limiting sense.

What I claim as my invention is:

A locking device for automobiles having a collar adapted to engage a casing of a steering spindle, pins securing the locking device in position, a vertically disposed locking pin slidably mounted in the locking device and forming a cover member for the said pins, a spring encircling the upper end of the locking pin designed to hold the locking pin in unlocked position, the said pin having peripheral recesses and a transversely extending locking bolt coacting with the recesses to hold the locking pin in the desired position.

In witness whereof I have hereunto set my hand.

WILLIAM BENSON TURNER.